(12) United States Patent
Liu et al.

(10) Patent No.: US 11,907,176 B2
(45) Date of Patent: Feb. 20, 2024

(54) CONTAINER-BASED VIRTUALIZATION FOR TESTING DATABASE SYSTEM

(71) Applicant: International Business Machines Corporation, Armonk, NY (US)

(72) Inventors: Xin Peng Liu, Beijing (CN); ShengYan Sun, Beijing (CN); Shuo Li, Beijing (CN); Xiaobo Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1292 days.

(21) Appl. No.: 16/409,284

(22) Filed: May 10, 2019

(65) Prior Publication Data

US 2020/0356538 A1 Nov. 12, 2020

(51) Int. Cl.
*G06F 16/17* (2019.01)
*G06F 16/188* (2019.01)
*G06F 9/50* (2006.01)
*G06F 11/30* (2006.01)
*G06F 16/176* (2019.01)
*G06F 12/1072* (2016.01)

(52) U.S. Cl.
CPC .......... *G06F 16/196* (2019.01); *G06F 9/5077* (2013.01); *G06F 11/301* (2013.01); *G06F 12/1072* (2013.01); *G06F 16/1774* (2019.01)

(58) Field of Classification Search
CPC .. G06F 16/196; G06F 16/1774; G06F 9/5077; G06F 11/301; G06F 12/1072; G06F 16/1072
USPC ........................................................ 707/704
See application file for complete search history.

(56) References Cited

U.S. PATENT DOCUMENTS

| 5,226,143 A * | 7/1993 | Baird .................. G06F 12/0815 |
| | | 711/147 |
| 9,811,668 B2 | 11/2017 | Sabetta et al. |
| 2018/0060177 A1* | 3/2018 | Shanthaveerappa ........................ |
| | | G06F 11/1458 |
| 2018/0137139 A1* | 5/2018 | Bangalore ........... G06F 16/2379 |

OTHER PUBLICATIONS

P. Mell, et al. "The NIST Definition of Cloud Computing", NIST Special Publication 800-145, Sep. 2011, Gaithersburg, MD.
A. Gambi et al. "Cut: Automatic Unit Testing in the Cloud", International Symposium on Software Testing and Analysis (ISSTA) Proceedings of the 26th ACM SIGSOFT, 2017, pp. 364-367.
M. Bracey "DB2 9 for z/OS: Buffer Pool Monitoring and Tuning" IBM Redpaper, ibm.com/redbooks 2009.

* cited by examiner

*Primary Examiner* — Hosain T Alam
*Assistant Examiner* — Tracy M McGhee
(74) *Attorney, Agent, or Firm* — Stephanie Carusillo; George S. Blasiak; Heslin Rothenberg Farley & Mesiti P.C.

(57) ABSTRACT

Methods, computer program products, and systems are presented. The methods include, for instance: receiving a request for a lock on a page from a virtual database amongst two or more virtual databases, the virtual database including a number of containers respectively corresponding to the same number of database components of the virtual database. A copy of the page is refreshed with a latest copy of the page in an overall cache prior to granting the lock based on ascertaining that the page is not locked by any other virtual database. The virtual database is granted with the lock and have an exclusive access to the page.

18 Claims, 7 Drawing Sheets

CONTAINER-BASED VIRTUALIZATION FOR TESTING DATABASE SYSTEM

TECHNICAL FIELD

The present disclosure relates to system test service, and more particularly to methods, computer program products, and systems for testing numerous configurations for a database system by virtualization.

BACKGROUND

Conventionally mainframe computers are used for processing massive amount of data common in areas including census information, industry/consumer statistics, and financial transactions. However, mainframe computers that are currently in use are not as speedy with startup due to reasons including inherently redundant architecture, extensive throughput demands with running computation tasks, backward compatibilities with many versions of software suites, and other considerations on fault tolerance and stability that do not concern mid-range servers. As mainframe computers running database systems are heavily used in many areas of aforementioned applications, new database system components and applications are continuously developed. For applications and components of a database system that would run on mainframe computers, cloud computing environments are increasingly used as a platform for development and testing.

SUMMARY

The shortcomings of the prior art are overcome, and additional advantages are provided, through the provision, in one aspect, of a method. The method includes, for instance: receiving, by one or more processor, a request for a lock on a page from a virtual database amongst two or more virtual databases, the virtual database including a number of containers respectively corresponding to the same number of database components of the virtual database; refreshing, by the one or more processor, a copy of the page with a latest copy of the page in an overall cache that is commonly accessed by the two or more virtual databases, in order for the virtual database to fetch the latest copy of the page from the overall cache, based on ascertaining that the page is not locked by any other virtual database; and granting, by the one or more processor, the lock on the page to the virtual database for an exclusive access to the page.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
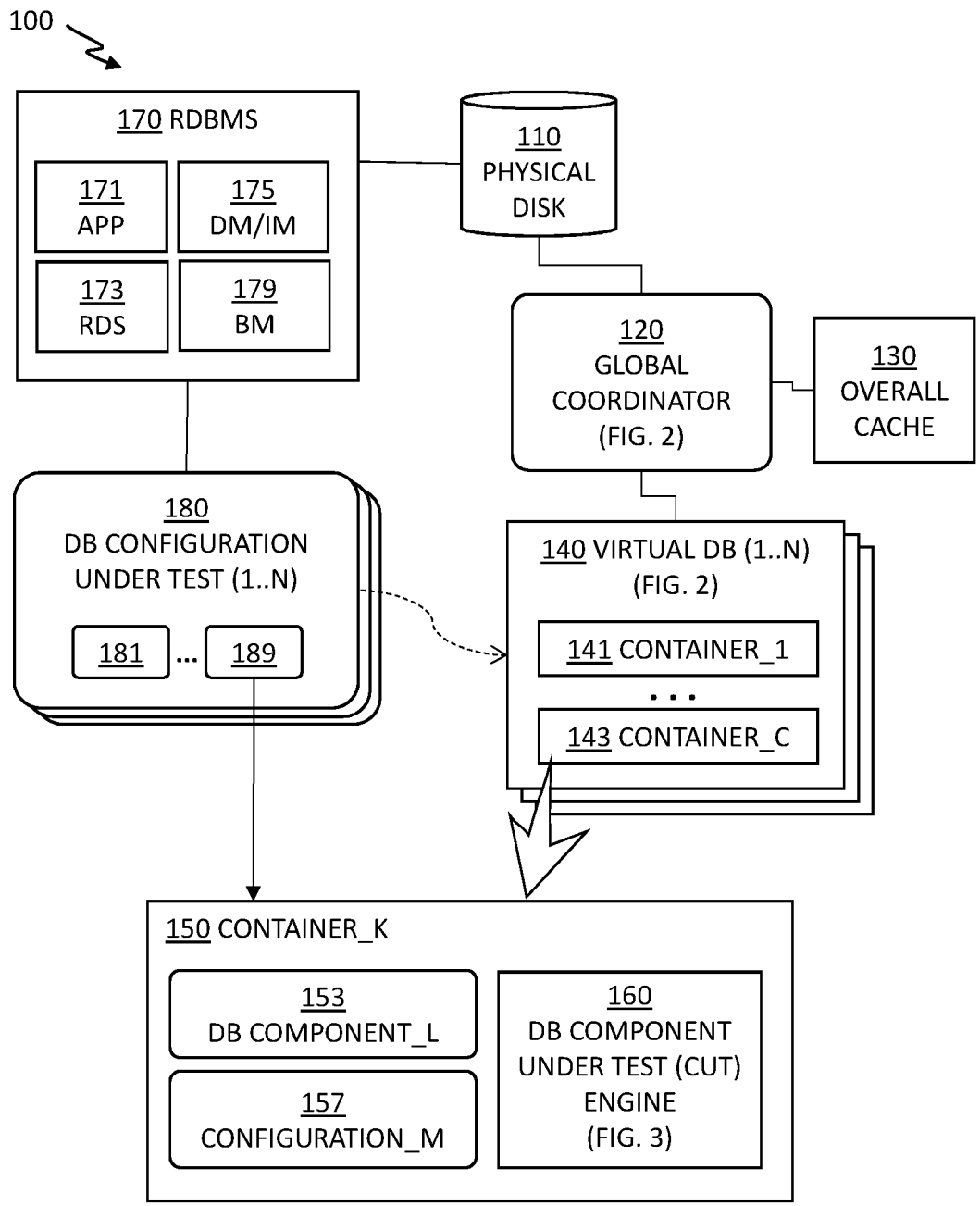
FIG. 1 depicts a system for database system test virtualization, in accordance with one or more embodiments set forth herein.

FIG. 1 depicts a system 100 for database system test virtualization, in accordance with one or more embodiments set forth herein.

The system 100 includes a database system, database system configurations to test, and virtual databases respectively corresponding to each database system configuration to test. The system 100 further includes a global coordinator 120 and an overall cache 130 that is operatively coupled to the global coordinator 120, which ensure data consistency in the database system during transactions by the virtual databases.

In one embodiment of the present invention, the database system includes a physical disk 110 and a relational database management system (RDBMS) 170. In this specification, the RDBMS 170 indicates a relational database and a management system corresponding to the relational database. The relational database is often a set of tables stored in the physical disk 110 and manipulated in accordance with the relational model of data based on the statements/executable codes interfaced via the database management system. The RDBMS 170 also includes a set of system catalog tables that describe the logical and physical structure of the data, a configuration file containing the parameter values allocated for the relational database, and a recovery log with ongoing transactions and achievable transactions.

In this specification, the RDBMS 170 is also referred to as a database (DB) for brevity, particularly when used in terms indicating other elements of the system 100. The RDBMS 170 includes database applications (APP) 171, a relational data service (RDS) 173, a data manager and an index manager (DM/IM) 175, and a buffer manager (BM) 179. The RDS 173 of the RDBMS 170 is a subsystem including various relational data processing components including, but not limited to, a parser, a precompiler, an optimizer, an interpreter, and a structure generator that are utilized to generate an executable file of the APP 171, as well as an access authorization process and runtime process for the executable file of the APP 171.

The DM/IM 175 is represented as a single database component as subject data is often "sargable", indicating that the subject data can be a search argument. In relational databases, a condition, or a predicate, of a query is referred to be as sargable if the relational database engine can execute the query faster by use of an index.

Examples of the database application include, but are not limited to, BIND, DML, DDL, EXECUTE. In DB2, the "compile" process is called BIND, and the "load module" is called a PACKAGE. BIND takes source code of the database application, for example, in the SQL, and generates an executable code, referred to as a PACKAGE, based on the source code. DML indicates a data manipulation language, a type of a computer programming language particularly used for inserting, deleting, and modifying data in a database. The DML can indicate a certain group of data manipulation statements in a broader database language such as SELECT, INSERT, UPDATE, and DELETE in SQL. Similarly, Data Definition or Data Description Language (DDL) is similar to data declaration/definition in other programming languages and used for defining data structures, particularly, database schemas, in adding columns and setting data types. For example, certain collection of SQL statements, such as CREATE, DROP, or ALTER, can be referred to as DDL as the statements would result in modifying the schema of the database by adding, changing, or deleting definitions of tables or other elements. SQL EXECUTE statement group executes a dynamic SQL statement parameter and returns a scalar result to local variables, or can be used to invoke a predefined procedure.

Each element in the RDBMS 170 can be configured individually or collectively in order to control operations of the RDBMS 170. In the system 100, N number of DB configurations under test are present. A DB configuration under test 180 of the N number of DB configurations under test includes configurations for individual components 181, 189 for testing. In order to test the DB configuration under test 180, N number of virtual databases that respectively correspond to each DB configuration under test 180 are generated in accordance with the embodiments of the present invention.

Examples of DB configurations under test include, but are not limited to, configuration parameters for the BM 179 of a virtual buffer pool size in a number of buffers, a frame size for each buffer pool, a sequential steal threshold for the buffer pool in a percentage of the buffer pool that is allowed for sequentially accessed pages, a parallel sequential threshold for the buffer pool in a percentage of the sequential steal threshold that is usable for parallel processing, a deferred write threshold for the buffer pool in a percentage of the virtual buffer pool that can be occupied unavailable pages, a vertical deferred write threshold in a percentage of the virtual buffer pool that can be occupied by updated pages from one data set, and a page-stealing algorithm that is used for the buffer pool selected from Least recently used (LRU), First-in First-out (FIFO), or None, an indication whether or not the buffer pool should be fixed in a physical storage, and an indication whether or not the buffer pool size would be autonomically adjusted.

As with configuration parameters for the BM 159, respective operations of the RDS 151, the DM 153, and the IM 157 of the relational database management system (RDBMS) 150 can be configured by use of one or more of configuration parameters respective to each component of the RDBMS 150.

A virtual database (VDB) 140 of the N number of virtual databases is configured according to the DB configuration under test 180 of the N number of DB configurations to test. The VDB 140 includes multiple containers 141, 143 respectively implementing DB components with a particular set of configuration parameter values for the DB component. Detailed operations of the VDB 140 in the context of write operation by use of the global coordinator 120 are presented in FIG. 3 and corresponding description.

Containers indicate a virtualization technique to isolate runtime systems of applications while running on a same operating system and to provide a virtual platform for applications to run in separate virtual address spaces on the same operating system. Unlike hypervisor systems facilitating virtual machines (VMs) with respective operating systems on top of the hypervisor in order to simulate virtual hardware, containers are implemented on top of a single operating system by use of a container manager that provides virtual-memory support for isolation from runtime systems of other containers, but still utilize basic services of the underlying operating system. Accordingly, container systems have a lower overhead than VMs, and in a single container system, there can be multitudinous containers running at one time on the same underlying operating system. Container systems usually provide service isolation between containers, and consequently, can be limited with accessing resources of the operating system. Each container has distinctive virtual address space from other containers, as the runtime system of each container is separated.

Embodiments of the present invention utilizes containers for respective DB components as containers provide an optimal level of virtualization to test distinctive configuration parameter values for various versions of the same database system on mainframe computers. Embodiments of the present invention accordingly achieves the flexible test environment and virtual activation of multiple instances of virtual database with minimal overhead on resources and virtualization to perform desired tests.

In embodiments of the present invention, the system 100 utilizes containers for individual database components to form the VDBs to test configurations for the respective database components rather than virtual machines, because no matter how different configuration parameter values, the database system runs on the same operating systems and because the system 100 would benefit with a more number of virtual databases with distinctive configurations.

In one embodiment of the present invention, each container provides a distinctive service, as in the containers 141, 143 for respective RDBMS components and each container is isolated from other containers within the VDB 140 by default as provided by the underlying container system. Accordingly, in order for the VDB 140 of respective containers 141, 143 as respective RDBMS components, each container is provided with a certain communication method between containers 141, 143 of the VDB 140. In this specification, respective functionalities of the RDBMS components 171, 173, 175, 179, as well as various elements of the RDS 173 are presumed to be encapsulated in each container.

A container K 150 represents elements of containers 141, 143 in the VDB 140. The container K 150 implements a DB component L 153, where 1<L<C. A configuration M 157 is one of configurations to test for the DB component L 153. The container K 150 of the VDB 140 further includes a DB component under test (DB CUT) engine 160 which accommodates communications amongst multiple containers 141, 143 in the VDB 140 such that the VDB 140 would function as an integral database system. Detailed operations of the DB CUT engine 160 are presented in FIG. 3 and corresponding description.

The global coordinator 120 and the overall cache 130 controls locking on a memory page, or simply a page, upon being requested by one of the virtual databases, such that the page would be accessed by only one virtual database at one time referred to as mutual exclusion. The global coordinator 120 and the overall cache 130 also ensure data consistency by refreshing local caches of the page in each virtual databases with the most recent copy of the page subsequent to any write transaction on the page. Detailed operations of the global coordinator 120 as interacting with virtual databases are presented in FIG. 3 and corresponding description.

When a component of the RDBMS 170 or a database application for the RDBMS 170 is developed, the newly developed component or application should be tested with various configurations to ensure compatibility of the newly developed component or application with currently deployed instances of the RDBMS 170 of many versions. However, mainframe computers are not readily available for restarting with new configurations to test the newly developed codes because mainframe processing time for testing is very limited and activation delay is significant. As noted, the database systems running on mainframe computers routinely have computational workload to process under certain service agreements. Also, because the mainframe computers are very costly, not many developers of the RDBMS component/application can afford a mainframe computer for testing purposes. Developers of the newly developed RDBMS component/application should still apply various combinations with distinctive sets of values for configuration parameters controlling operations of respective components of the RDBMS 170, in order to properly test the newly developed RDBMS component/application and to find out recommendable combinations of configuration parameter values respective to currently deployed versions of the RDBMS.

For cloud platforms, database systems are to be activated with various configurations for testing the newly developed RDBMS component/application. However, as cloud platforms are often used to provision data processing services rather than as a development platform, testing database system configurations on cloud platforms would be impractical and the activation delay with untested configuration would be intolerable.

The VDB 140 can be generated as a combination of containers implementing respective DB components 171, 173, 175, 179 and a particular DB configuration to test 181, 189 for respectively corresponding DB components. For example, if the optimizer of the RDS 173 should be tested with three (3) different sets of configuration parameter values, for two (2) different sets of configuration parameter values for the interpreter of the RDS 173, respectively to four (4) different sets of configuration parameter values for the BM 179, the system 100 would only need 3 optimizer containers, 2 interpreter containers, and 4 BM containers with respective configuration parameter values, in order to test twenty-four (N=3×2×4=24) distinctively configured VDBs 140 by combining the aforementioned containers.

Embodiments of the present invention can facilitate rapid development, deploy and debug of DB components for mainframe RDBMS, by dividing DB components to respective containers and by virtualizing the containers of certain part of DB functionality. Particularly, the developers of the DB components can easily test configurations in virtual environment without requiring an actual mainframe computer that is costly and slow with activation delays.

In one embodiment of the present invention, the VDBs 140 are instances of IBM® DB2® generated and tested by use of a cloud service on z Systems® mainframe computer running z/OS®. (IBM, DB2, z/Systems, and z/OS are registered trademarks of International Business Machines Corporation.) By use of the system 100 as implemented as a cloud service, developers of DB2 components and applications can virtually test numerous configurations for rapid deploy and debug of newly developed DB2 codes as if multiple mainframes are at their disposal without ever needing to configure the database system in an actual mainframe computer and start up with a lengthy activation sequence.

An exemplary database application in SQL as below is performed by the VDB 140, in a manner similar to the conventional RDBMS but by using inter-container communication as performed by the DB CUT engine 160.

Exemplary database application in SQL:
Line 1) SELECT A.COL_2, B.COL_2 FROM TAB_1 AS A
Line 2) INNER JOIN TAB_2 AS B
Line 3) WHERE A.COL_1=B.COL_1 AND A.COL_3>=5 AND B.COL_3<=8
Line 4) ORDER BY A.COL_2, B.COL_2;

According to ORDER BY clause of line 4, the database application needs to perform a SORT operation at line 4. In lines 1 through 3, the database application would generate input for the SORT in line 4, which is a result of JOIN of tables TAB_1 and TAB_2.

For TAB_1, the database application utilizes an access method RSCAN, indicating relational scan of tables, which would scan all data pages of table TAB_1 to fetch data satisfying the condition of line 1. The RSCAN operation is initiated in the RDS component of the RDBMS, which is implemented by the RDS container, or more specific functional element of the RDS such as the interpreter container for the RSCAN operation. In order to actually fetch the data pages in performing the RSCAN operation, the RDS container communicates the data page request to the DM component of the DM container in the same VDB 140.

After receiving the data page request, the DM component in the DM container relays the data page request initiated from the RSCAN operation to the BM component of the BM container to fetch the data pages satisfying the condition of line 1.

Once the BM component of the BM container receives the request for the data pages, the BM component of the BM container checks if the requested data page is present in a buffer pool of the VDB. If the requested data page is present in the buffer pool, the BM component of the BM container sends the requested data page to the DM component of the DM container in the VDB 140. If the requested data page is not in the buffer pool, the BM component of the BM container fetches the requested data page from the physical disk 110 and then sends the requested data page to the DM component of the DM container in the VDB 140 that had requested the BM component earlier.

The exemplary database application above also performs an ISCAN thread for rows of table TAB_1 that satisfies conditions specified in line 1. The RDS component in the RDS container of the VDB 140 uses the rows satisfying the conditions as index keys to request the data pages from the DM component of the DM container for JOIN operation of line 2. The DM component of the DM container sends the index key to the IM component of the IM container for a more efficient retrieval of qualified rows. The IM component of the IM container sends a data page request based on the index, which the BM component of the BM container will process in a manner similar to the data page request from the DM component.

After the IM component of the IM container locates an index entry having a specific ROW_ID by use of the index key value obtained from the BM component, the IM component of the IM container communicates the ROW_ID to the DM component of the DM container. The DM component of the DM container requests the data page by the ROW_ID to the BM component of the BM container, and subsequently communicates qualified row(s) from table TAB_2 to the RDS component. Once all qualified inputs are gathered, then the RDS component performs the SORT operation against the qualified inputs.

Figure 2:
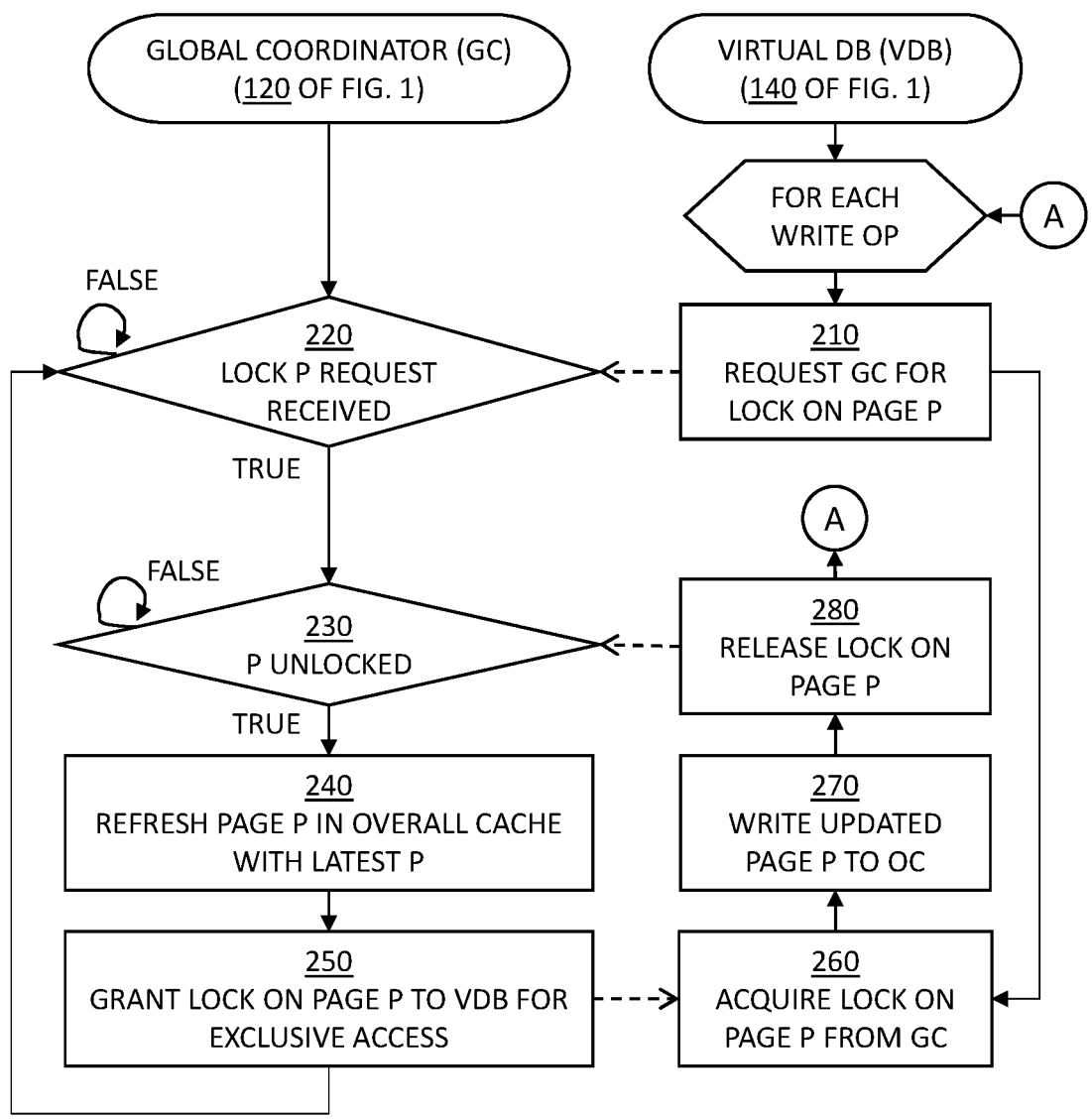
FIG. 2 depicts a flowchart of operations performed by the global coordinator and a virtual database, in accordance with one or more embodiments set forth herein.

FIG. 2 depicts a flowchart of operations performed by the global coordinator 120 and the VDB 140, in accordance with one or more embodiments set forth herein.

The global coordinator 120 performs blocks 220, 230, 240, and 250, based on various communication with VDBs. As noted, the global coordinator 120 and the overall cache 130 operate as a unit to ensure data consistency of the database system during transactions performed by multiple VDBs. The VDB 140 communicating with the global coordinator 120 performs blocks 210, 260, 270, and 280. More particularly, a buffer manager (BM) component of the BM container of the VDB 140 performs the aforementioned blocks in order to perform write operations to the physical disk 110, which requires coordination amongst all VDBs by the global coordinator 120 for data consistency.

In the VDB 140, DB components other than the BM component communicate only with other DB components of the VDB according to data flow of conventional RDBMS. The BM components of all VDBs in action shall communicate with the global coordinator 120 to preserve data integrity shared among the VDBs.

In block 210, the VDB 140 requests the global coordinator 120 for a lock on a memory page P, in order to perform a write operation on the page P. The global coordinator receives a request for the lock on the page P in block 220, as shown with a dashed arrow from block 210 to block 220 of the global coordinator 120. The lock on the page P is for exclusive access to the page P to ensure only one process accesses the page P at one time. Then, the VDB 140 proceeds with block 260.

In block 220, the global coordinator 120 receives the request for the lock on the page P as sent from the VDB 140 in block 210. The global coordinator 120 waits for a request for a lock to a memory page in block 220, and proceeds with block 230 when the request for the lock on the page P is received.

The global coordinator 120 interacts with multiple VDBs concurrently, so the global coordinator 120 identifies each request for a lock on memory page with an identifier of a VDB that requested the memory page, as well as a page number of the page that had been requested. The global coordinator 120 will keep a wait queue, for example, of VDBs that requested a particular page such that the VDBs would acquire the requested lock on the page in order of the respective requests on a first-come first-serve basis.

In block 230, the global coordinator 120 determines whether or not the page P is locked. If the page P is already locked, indicating that another VDB other than the VDB 140 that had performed block 210 above is presently performing a write operation on the page P, then the global coordinator 120 waits until the lock on the page P is released by the another VDB holding the lock at the moment. The global coordinator 120 proceeds with block 240 when the lock on the page P is released, and the page P is ready for the VDB 140 that awaits for the lock to the page P.

In block 240, the global coordinator 120 refreshes page P in the overall cache 130 with the latest page P from a local cache of a VDB that wrote the page P most recently or from the physical disk 110 if the page P is retrieved from the physical disk 110. Then, the global coordinator 120 proceeds with block 250.

In block 250, the global coordinator 120 grants the lock on the page P to the VDB 140 such that the VDB 140 can exclusively access the page P for the write operation. Then, the global coordinator 120 loops back to block 220 to wait for a lock request.

As noted, the global coordinator 120 processes the lock request in blocks 220, 230, 240, and 250 per page, and any request for a lock on another page can run concurrently in another thread of the global coordinator 120.

In the same embodiment of the present invention as above where a wait queue of VDBs for each page lock, the global coordinator 120 grants a lock to a next VDB in the wait queue.

In block 260, the VDB 140 acquires the lock on the page P requested in block 210 from the global coordinator 120 performing block 250 as shown by a dashed arrow from block 250 of the global coordinator 120 to block 260. In certain embodiments of the present invention, the VDB 140 retrieves the latest page P from the overall cache 130 or the physical disk 110, as indicated by the global coordinator 120, to a local cache of the VDB 140. Then, the VDB 140 proceeds with block 270.

In block 270, the VDB 140 processes contents of the page P and writes the updated page P to the overall cache 130 that is coupled to the global coordinator 120 while holding the lock on the page P. Then, the VDB 140 proceeds with block 280.

In block 280, the VDB 140 releases the lock on the page P back to the global coordinator 120 as shown with a dashed arrow from block 280 to block 230 of the global coordinator 120, as the write operation is completed. Then, the VDB 140 terminates the write operation. The VDB 140 iteratively performs blocks 210, 260, 270, and 280 for each write operation on a subject page.

Figure 3:
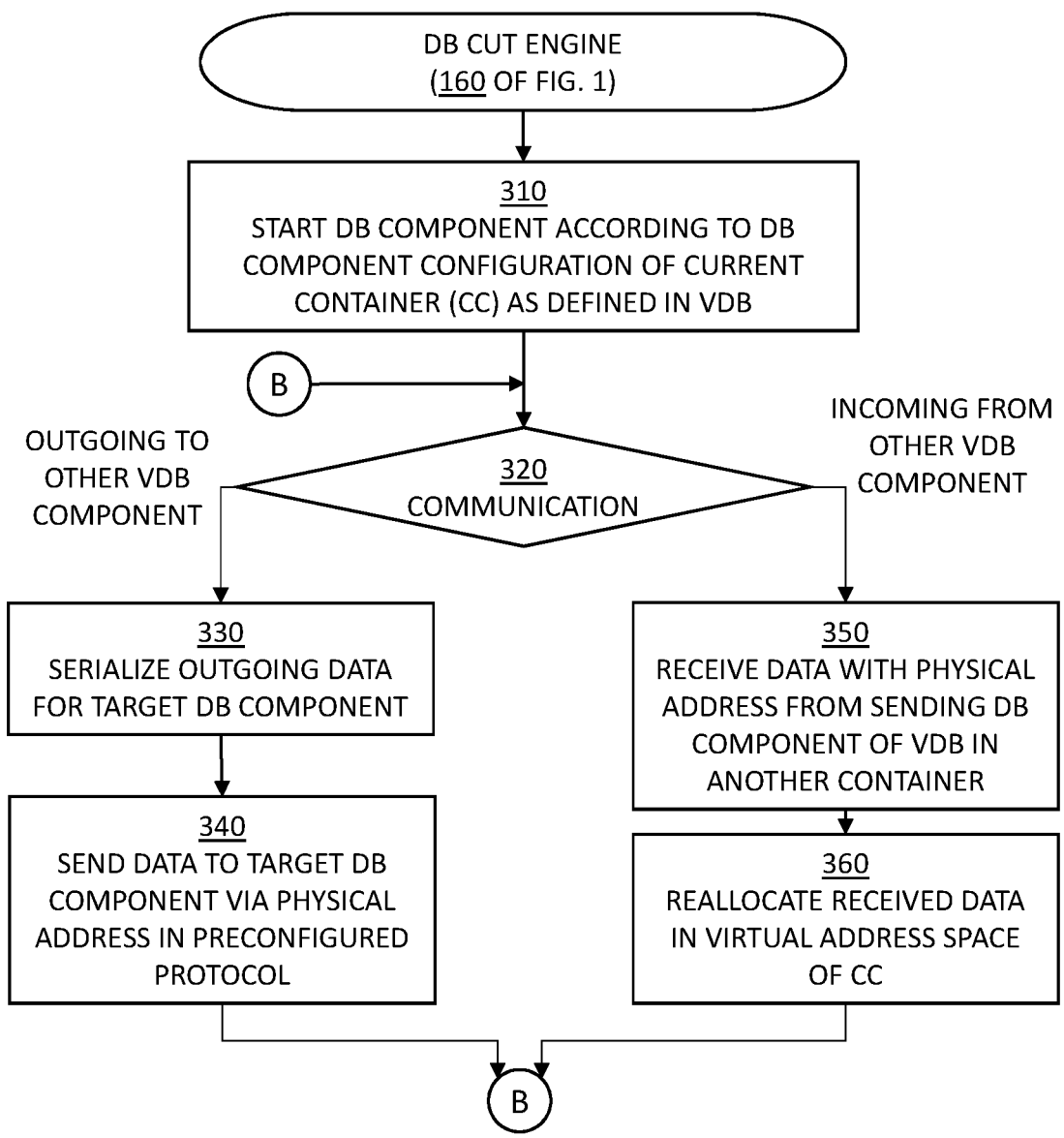
FIG. 3 depicts a flowchart of operations performed by the DB Component Under Test (DB CUT) engine, in accordance with one or more embodiments set forth herein.

FIG. 3 depicts a flowchart of operations performed by the database component under test (DB CUT) engine 160, in accordance with one or more embodiments set forth herein.

In block 310, the DB CUT engine 160 starts the DB component of the current container (CC) according to the DB configuration under test 180 as implemented by the virtual database (VDB) 140 in which the current container (CC) is running. Then, the DB CUT engine 160 proceeds with block 320.

For example, the optimizer in the RDS 173 of the RDBMS 170 initiates by loading optimizer code library and then by reading configuration parameter values from the optimizer portion of the DB configuration under test 180. The optimizer can be configured to create a system dump prior to running. If the configuration parameter values from the optimizer portion of the DB configuration under test 180 indicates that the system dump is to be created, then the system dump for particular system memory spaces corresponding to data, stack, heap, and global area is created to monitor content of the system memory at the beginning of the optimizer.

As noted, each container virtualizes DB components in the VDB 140. Conventionally, DB components in a single database system communicates with one another by invoking procedure of other DB components as all DB components are in the same address space of the database system. The DB components virtualized by respective containers in the embodiments of the present invention have respective address spaces for each container, and cannot communicate by calling procedures of other DB components.

In block 320, the DB CUT engine 160 determines if the DB component has data to send to other DB component in the VDB 140 or if there is any incoming data to the DB component from other DB component in the VDB 140. If the DB CUT engine 160 determines that the DB component has data to send to other DB component in the VDB 140, then the DB CUT engine 160 proceeds with block 330. If the DB CUT engine 160 determines that the DB component has incoming data from other DB component in the VDB 140, then the DB CUT engine 160 proceeds with block 350.

In block 330, the DB CUT engine 160 serializes the outgoing data for other DB component in the VDB 140 by translating the physical address of the data to send. The data is represented in the address space of the CC and located with a virtual address. In certain embodiments of the present invention, the DB CUT engine 160 utilizes system utility functions of the underlying operating system to translate the virtual address of the data in the address space of the CC to the physical address for communication with other DB components in respective containers. Then, the DB CUT engine 160 proceeds with block 340.

In this specification, the physical address indicates a uniquely distinctive address across all DB components in the VDB 140 in the underlying operating system, while the data in the CC is represented by a virtual address of the address space of the CC. Because the virtual address spaces of containers implementing respective DB components can overlap based on the address scheme of the container manager, virtual addresses of each container is limited for a use within the container, and containers in the same VDB 140 cannot communicate with their respective virtual addresses.

In block 340, the DB CUT engine 160 sends the data to a target DB component of the VDB 140 as serialized in block 330. In certain embodiments of the present invention, the DB CUT engines 160 of all DB components in the VDB 140 are coordinated with a communication protocol for the inter-container communications. In the same embodiments as above, the DB CUT engine 160 serializes the data at the physical address and sends over the predefined communication protocol. Examples of the communication protocol include, but are not limited to, Transmission Control Protocol/Internet Protocol (TCP/IP), Distributed Relational Database Architecture (DRDA), and Representational State Transfer (REST). Then, the DB CUT engine 160 loops back to block 320.

In block 350, the DB CUT engine 160 receives incoming communication of serialized data from other DB component of the VDB 140, as processed by block 330 by another DB CUT engine of the sending DB component container. The sending DB component is implemented in another container, which uses separate address space from the receiving DB component in the CC. Then, the DB CUT engine 160 proceeds with block 360.

In block 360, the DB CUT engine 160 reallocates the serialized data received in block 350 in the virtual address space of the CC such that the received data can be computable by the DB component of the CC. Then, the DB CUT engine 160 loops back to block 320.

In one embodiment of the present invention, the VDB 140 includes a RDS container implementing the RDS 173 of the RDBMS 170, a DM container implementing the DM portion of the DM/IM 175 of the RDBMS 170, an IM container implementing the IM portion of the DM/IM 175 of the RDBMS 170, and a BM container 179 implementing the BM 179 of the RDBMS 170. The RDBMS 170 is in DB2 architecture.

According to a currently running database application, often written in certain query languages such as Structured Query Language (SQL), the RDS container performs various functions of the RDS 173 including, but not limited to sort, join, index scan, and relational scan. In order to perform an index scan, the RDS container communicates with the IM container to scan index pages, and to perform a relational scan, the RDS container communicates with the DM container to scan data pages. The IM container can also communicate with the DM container to fetch a data page as located from the index pages. In turn, the DM container and the IM container communicates with the BM container to get the index page and the data page from a buffer pool of the BM, the overall cache 130, and/or the physical disk 110, via the global coordinator 120 if necessary as presented in FIG. 2 and corresponding description. Once the SQL operation is performed and the result to be written into the database, then the RDS-DM/IM-BM chain of communication will be invoked to write updated page(s) in the physical disk 110.

Figure 4:
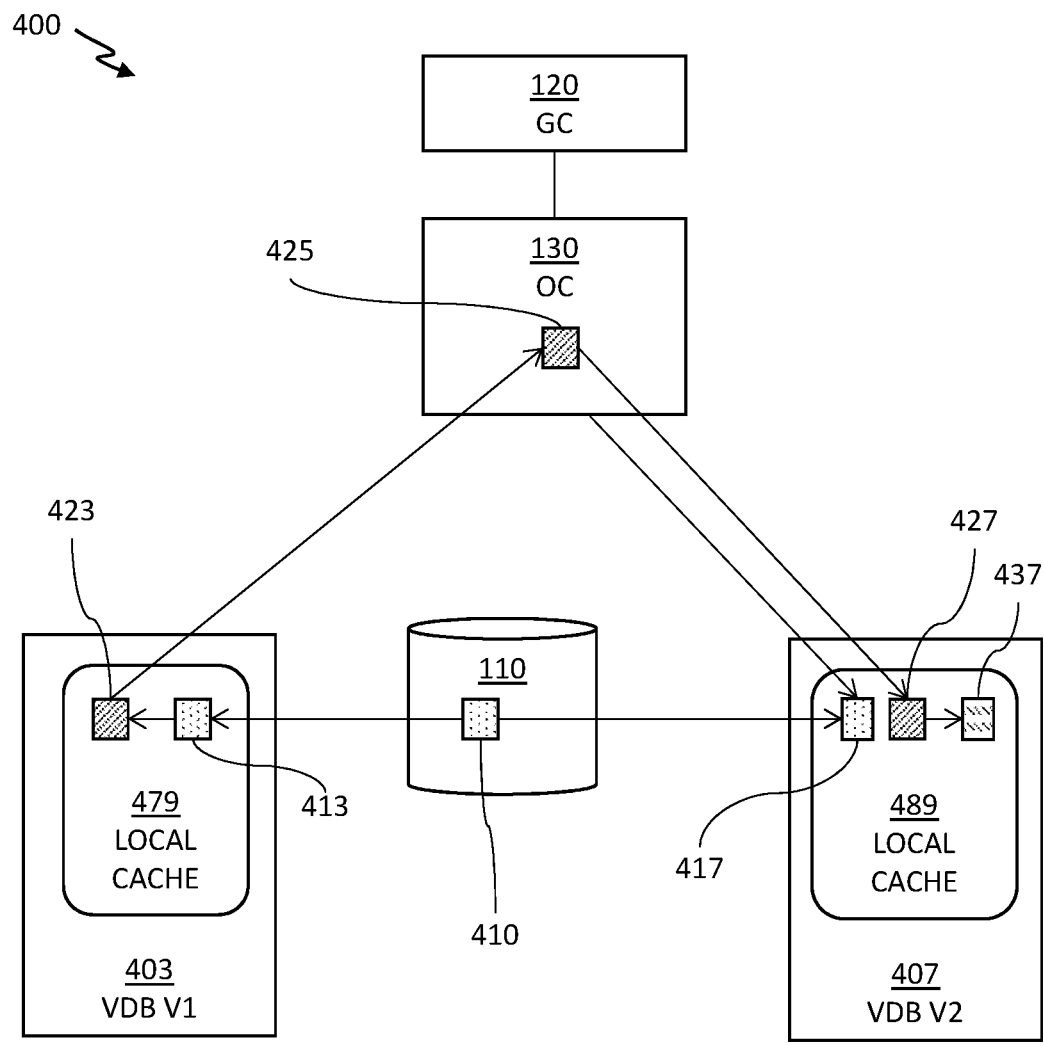
FIG. 4 depicts an exemplary transaction sequence between two virtual database systems as governed by the global coordinator, in accordance with one or more embodiments set forth herein.

FIG. 4 depicts an exemplary transaction sequence 400 between two virtual database systems as governed by the global coordinator 120, in accordance with one or more embodiments set forth herein.

The two virtual database systems VDB V1 403 and VDB V2 407 access the same page P 410 in the physical disk 110. As noted earlier, respective buffer manager (BM) components implemented as respective containers in both the VDB V1 403 and the VDB V2 407 communicate with the global coordinator (GC) 120 that controls the overall cache (OC) 130.

The VDB V1 403 requests the GC 120 for the lock on the page P 410 first, immediately followed by the VDB V2 407 requesting the page P 410. Accordingly, both the VDB V1 403 and the VDB V2 407 fetch the page P 410, and the VDB V1 403 has a copy of page P 413 in a local cache 479 of V1 403, and the VDB V2 407 has a copy of page P 417 in a local cache 489 of V2 407. The copies of the page P 410, 413, and 417 are identical in the physical disk 110, and the respective local caches 479, 489.

The V1 403 is granted the lock on the page P first from the GC 120 after creating the copy of page P 413, and the V2 407 waits for the lock while V1 403 processes the page copy of page P 413 in the local cache 479. The V1 403 processes content of the copy of page P 413, updates the copy of page P 413 to an updated copy of page P 423 in the local cache 479 of the V1 403, and releases the lock on page P.

Upon detecting the release of the lock on page P, the GC 120 copies the updated copy of page P 423 to the OC 425, as the updated copy of page P 423 is the latest version of the page P. The GC 120 subsequently grants the lock on page P to the V2 407, and the V2 407 is the first VDB in the wait queue for the lock on page P.

As the V2 407 is granted the lock on the page P from the GC 120, the V2 407 refreshes the copy of page P 417 in the local cache 489 of the V2 407 with the latest version of the page P 425 in the OC 130, as the copy of page P 417 currently in the local cache 489 of the V2 407 is not up to date, resulting in a refreshed copy of page P 427 in the local cache 489. The V2 407 processes content of the refreshed copy of page P 427, further updates the copy of page P 427 to another updated copy of page P 437 in the local cache 489 of the V2 407. The snapshot of FIG. 4 shows a moment prior to the release of the lock on page P by the V2 407. Once the lock is released, the GC 120 will update the copy of the page P in the OC 130 with the latest copy of page P 437, and then write back to the physical disk 110 if no other VDB is waiting for the page P, according to the buffer pool management/write policy of the system 100.

Certain embodiments of the present invention utilizes containers in implementing virtual database systems for configuration tests. Certain embodiments of the present invention employs containers respective to each components of the relational database management system for which new subsystem/component/application has been developed. By use of individually virtualized components of the database system in isolated containers, certain embodiments of the present invention facilitates much more efficient and streamlined virtual database test platform rather than having to implement numerous database systems on virtual machines, or occupying costly mainframe resources for testing configurations, and accordingly, can identify database configurations for deployment for newly developed components. Accordingly, certain embodiments of the present invention maximizes utilization of existing resources, and by combining containers with limited number of configurations reduces the time and effort required for testing newly developed database components in identifying deployable configurations. Certain embodiments of the present invention may be implemented by use of a cloud platform/data center in various types including a Software-as-a-Service (SaaS), Platform-as-a-Service (PaaS), Database-as-a-Service (DBaaS), and combinations thereof based on types of subscription. The configuration profile automation service can be provided for subscribed business entities/vendors of software applications in need from any location in the world.

Figure 5:
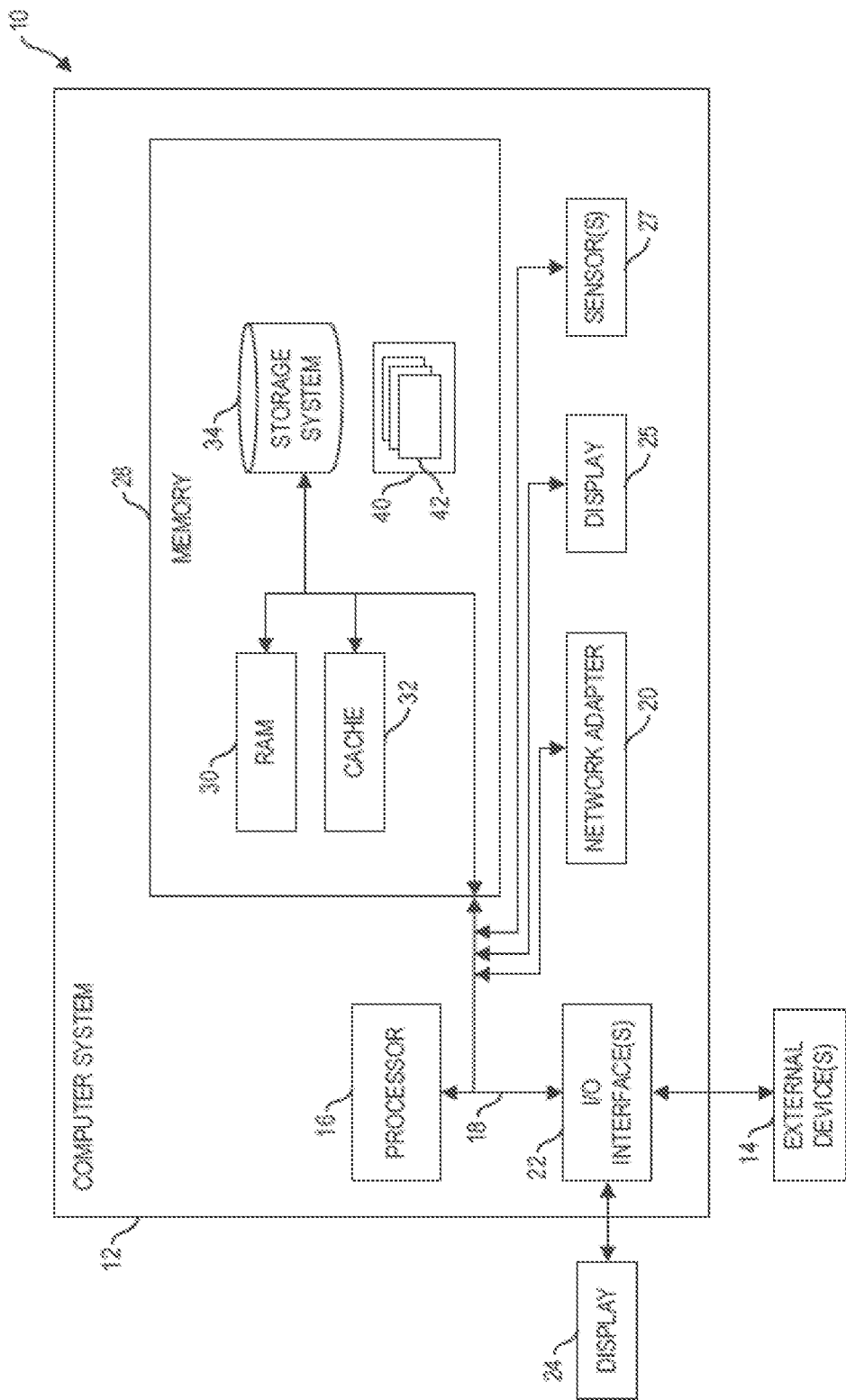
FIG. 5 depicts a cloud computing node according to an embodiment of the present invention.
Figure 6:
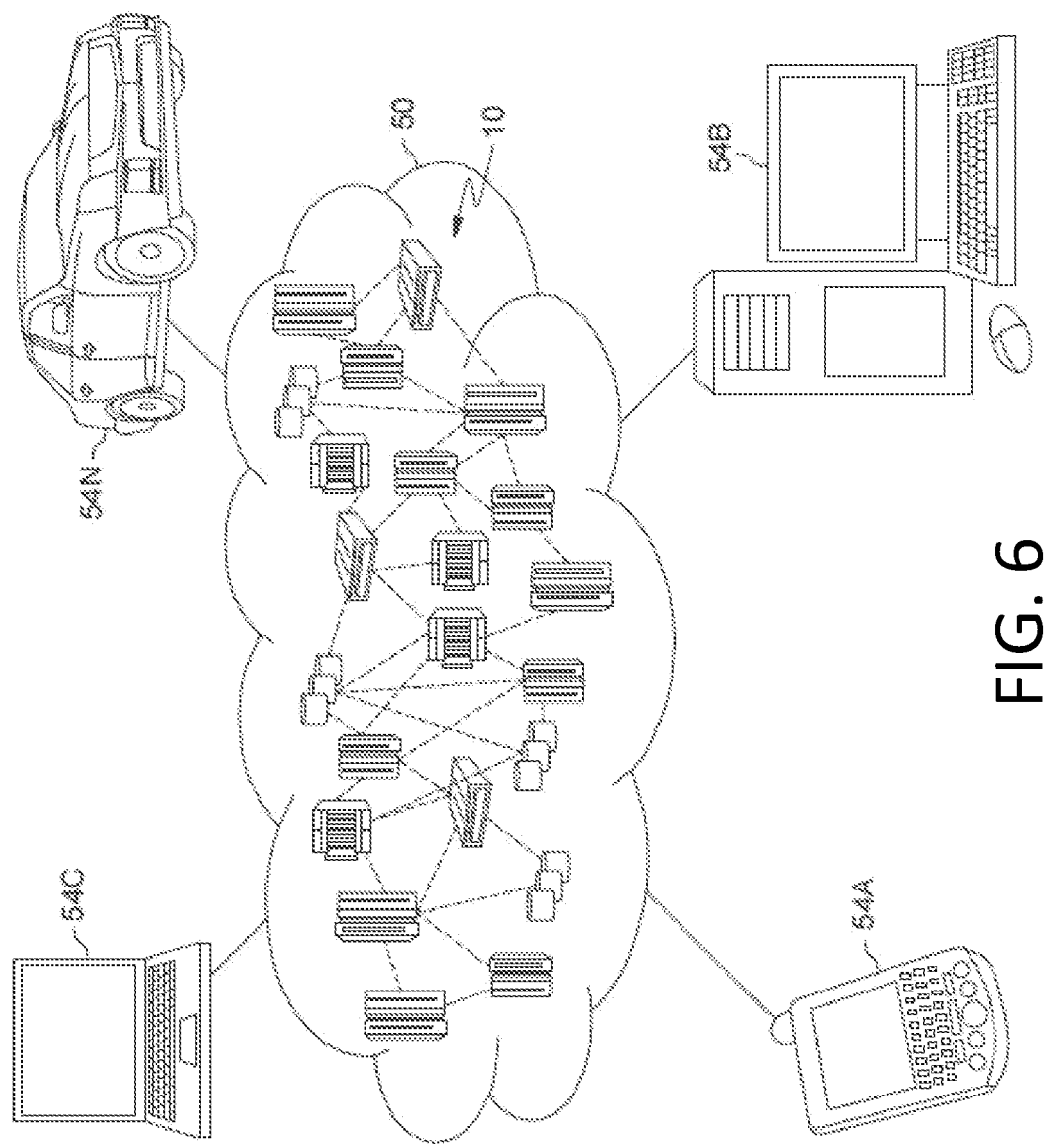
FIG. 6 depicts a cloud computing environment according to an embodiment of the present invention.
Figure 7:
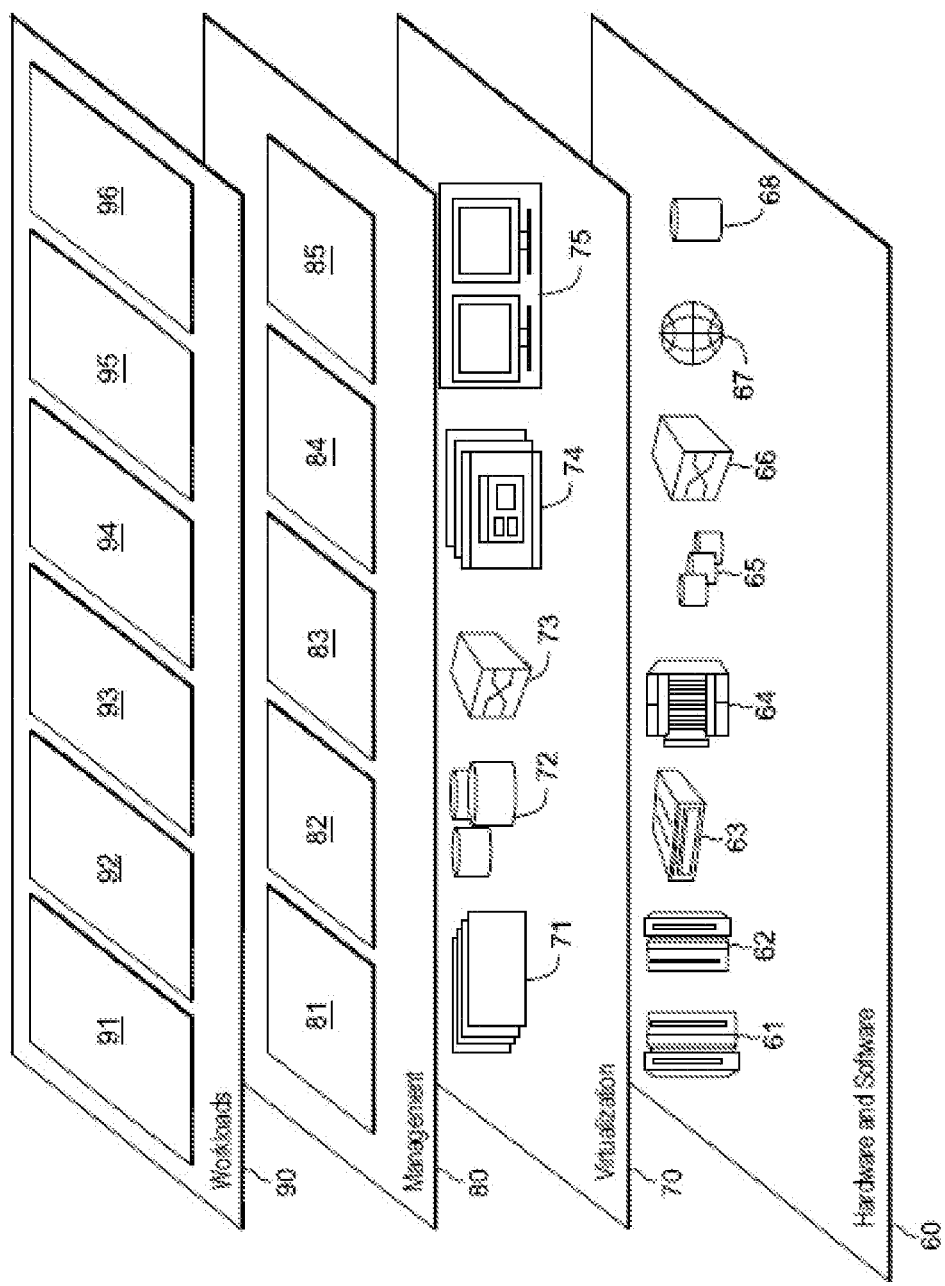
FIG. 7 depicts abstraction model layers according to an embodiment of the present invention.

FIGS. 5-7 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the global coordinator 120 and the DB component under test engine 160 of FIG. 1, respectively. Program processes 42, as in the global coordinator 120 and the DB component under test engine 160 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

In addition to or in place of having external devices 14 and the display 24, which can be configured to provide user interface functionality, computing node 10 in one embodiment can include another display 25 connected to bus 18. In one embodiment, the display 25 can be configured as a touch screen render and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or in addition be connected through I/O interface(s) 22. The one or more sensor device 27 can include a Global Positioning Sensor (GPS) device in one embodiment and can be configured to provide a location of computing node 10. In one embodiment, the one or more sensor device 27 can alternatively or in addition include, e.g., one or more of a camera, a gyroscope, a temperature sensor, a humidity sensor, a pulse sensor, a blood pressure (BP) sensor or an audio input device.

It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the container-based database system test virtualization 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising: receiving, by one or more processor, a request for a lock on a page from a virtual database amongst two or more virtual databases, the virtual database comprising a number of containers respectively corresponding to the same number of database components of the virtual database;

refreshing, by the one or more processor, a copy of the page with a latest copy of the page in an overall cache that is commonly accessed by the two or more virtual databases, in order for the virtual database to fetch the latest copy of the page from the overall cache, based on ascertaining that the page is not locked by any other virtual database, and granting, by the one or more processor, the lock on the page to the virtual database for an exclusive access to the page.

2. The computer implemented method of claim 1, further comprising: prior to the granting, updating a local cache of the virtual database with the latest copy of the page.

3. The computer implemented method of claim 2, further comprising: prior to the granting, dequeuing the virtual database from the wait queue of the page based on that the virtual database is the first entry in the wait queue of the page.

4. The computer implemented method of claim 1, wherein each container corresponding to one of the database components of the virtual database includes a set of configuration parameter values for testing the virtual database.

5. The computer implemented method of claim 4, wherein each container corresponding to one of the database components of the virtual database includes a communication process comprising a serialization of data outgoing to other database components of the virtual database for outside of an address space of a sending container and a deserialization of data incoming from other database components of the virtual database to manipulate the incoming data in an address space of a receiving container.

6. The computer implemented method of claim 5, wherein the communication process utilizes a communication protocol selected from Transmission Control Protocol/Internet Protocol (TCP/IP), Distributed Relational Database Architecture (DRDA), and Representational State Transfer (REST).

7. A computer program product comprising: a computer readable storage medium readable by one or more processor and storing instructions for execution by the one or more processor for performing a method comprising:

receiving a request for a lock on a page from a virtual database amongst two or more virtual databases, the virtual database comprising a number of containers respectively corresponding to the same number of database components of the virtual database;

refreshing a copy of the page with a latest copy of the page in an overall cache that is commonly accessed by the two or more virtual databases, in order for the virtual database to fetch the latest copy of the page from the overall cache, based on ascertaining that the page is not locked by any other virtual database; and granting the lock on the page to the virtual database for an exclusive access to the page.

8. The computer program product of claim 7, further comprising:

prior to the granting, updating a local cache of the virtual database with the latest copy of the page.

9. The computer program product of claim 7, further comprising:

prior to the refreshing, enqueuing the virtual database in a wait queue of the page based on ascertaining that the page is presently locked by other virtual database of the two or more virtual databases.

10. A system comprising: a memory; one or more processor in communication with the memory; and program instructions executable by the one or more processor via the memory to perform a method comprising:

receiving a request for a lock on a page from a virtual database amongst two or more virtual databases;

refreshing a copy of the page with a latest copy of the page in an overall cache that is commonly accessed by the two or more virtual databases, in order for the virtual database to fetch the latest copy of the page from the overall cache, based on ascertaining that the page is not locked by any other virtual database;

updating a local cache of the virtual database with the latest copy of the page; and granting the lock on the page to the virtual database for an exclusive access to the page, wherein the updating is performed prior to the granting.

11. The system of claim 10, further comprising:

prior to the refreshing, enqueuing the virtual database in a wait queue of the page based on ascertaining that the page is presently locked.

12. The system of claim 11, further comprising:

prior to the granting, dequeuing the virtual database from the wait queue of the page based on that the virtual database is the first entry in the wait queue of the page.

13. The system of claim 10, wherein each container corresponding to one of the database components of the virtual database includes a set of configuration parameter values for testing the virtual database.

14. The system of claim 13, wherein each container corresponding to one of the database components of the virtual database includes a communication process comprising a serialization of data outgoing to other database components of the virtual database for outside of an address space of a sending container and a deserialization of data incoming from other database components of the virtual database to manipulate the incoming data in an address space of a receiving container.

15. The computer implemented method of claim 1, wherein the method includes concurrently with the receiving, obtaining multiple requests for different respective page locks from different respective virtual databases, and marking the multiple requests with an identifier for the requesting virtual database and the page number subject to the respective page lock requests.

16. The computer implemented method of claim 1, wherein the method includes detecting the release of the lock on the page by the virtual database, and responsively to the detecting copying the updated page to the overall cache.

17. The computer implemented method of claim 1, wherein the method includes detecting the release of the lock on the page by the virtual database, responsively to the detecting copying the updated page to the overall cache, subsequent to the copying granting a page lock on the page to a second virtual database, wherein the second virtual database is a first virtual database in a wait queue for the lock on the page.

18. The computer implemented method of claim 1, further comprising: enqueuing the virtual database in a wait queue of the page based on ascertaining that the page is presently locked by other virtual database of the two or more virtual databases, wherein the enqueuing is performed prior to the refreshing.

* * * * *